United States Patent [19]

Large et al.

[11] Patent Number: 4,522,462
[45] Date of Patent: Jun. 11, 1985

[54] FIBER OPTIC BIDIRECTIONAL WAVELENGTH DIVISION MULTIPLEXER/DEMULTIPLEXER WITH TOTAL AND/OR PARTIAL REDUNDANCY

[75] Inventors: Scott F. Large, Billerica; Bruce D. Metcalf, Burlington, both of Mass.

[73] Assignee: The Mitre Corporation, Bedford, Mass.

[21] Appl. No.: 498,660

[22] Filed: May 27, 1983

[51] Int. Cl.³ .............................................. G02B 5/172
[52] U.S. Cl. .............................. 350/96.19; 350/96.16; 350/96.18
[58] Field of Search ............... 350/96.15, 96.16, 96.18, 350/96.19

[56] References Cited

U.S. PATENT DOCUMENTS

| 4,111,524 | 9/1978 | Tomlinson | 350/96.19 |
| 4,198,117 | 4/1980 | Kobayashi | 350/96.19 |
| 4,304,460 | 12/1981 | Tanaka et al. | 350/96.16 |
| 4,329,017 | 5/1982 | Kapany et al. | 350/96.15 |

FOREIGN PATENT DOCUMENTS

| 67972 | 12/1982 | European Pat. Off. | 350/96.15 |
| 146644 | 11/1979 | Japan | 350/96.18 |

OTHER PUBLICATIONS

Seki et al., Electronics Letters, 18(6), Mar. 18, 1982, "20-Channel Micro-Optic Grating Demultiplexer . . .," pp. 257–258.

Primary Examiner—William L. Sikes
Assistant Examiner—Frank González
Attorney, Agent, or Firm—Kenway & Jenney

[57] ABSTRACT

The wavelength division multiplexer/demultiplexer includes a gradient index of refraction (GRIN) lens and a diffraction grating located adjacent to one end of the GRIN lens. The diffraction grating is adapted for switching from a first angle to a second angle with respect to the GRIN lens. For both path and terminal equipment redundancy, first and second input optical fibers are located at first and second input locations on an end surface of the GRIN lens. A first and a second plurality of output optical fibers are also located on this end surface of the GRIN lens. The input and output optical fibers are located so that optical energy will travel from the first input optical fiber to the first plurality of output optical fibers when the diffraction grating is oriented at the first angle and optical energy will travel from the second input optical fiber to the second plurality of output optical fibers when the diffraction grating is oriented at the second angle.

6 Claims, 3 Drawing Figures

FIBER OPTIC BIDIRECTIONAL WAVELENGTH DIVISION MULTIPLEXER/DEMULTIPLEXER WITH TOTAL AND/OR PARTIAL REDUNDANCY

BACKGROUND OF THE INVENTION

This invention relates to fiber optic wavelength division multiplexers/demultiplexers and more particularly to such multiplexers/demultiplexers which provide total or partial redundancy.

One of the distinct advantages of fiber optics is the ability to carry a large number of channels at different optical wavelengths. With each channel capable of transmission at rates up to 400 megabits or greater, the multiplexing of many wavelengths onto a single fiber would increase the data capacity enormously.

A known method of wavelength division multiplexing/demultiplexing uses a gradient index of refraction or GRIN lens in which the index of refraction varies from the center out along a radius. Such a multiplexer/demultiplexer device using a GRIN rod is described by W. J. Tomlinson and G. D. Aumiller in *Applied Physics Letters*, Vol. 31, No. 3, Aug. 1, 1977, pages 169–171. A blazed diffraction grating serving as the optically dispersive element is placed near the end of the GRIN lens and oriented at an angle to it.

When used as a demultiplexer the GRIN lens/grating combination has optical energy entering the GRIN lens through an input optical fiber. Several wavelengths will have been combined to travel along the fiber and each of the wavelengths will have information impressed upon it. At the receiving end, the multiplexed wavelengths must be separated so that the information on each of the signals can be extracted. For example, if four separate wavelengths have been multiplexed and are traveling down the input fiber, the ray will travel through the GRIN lens and strike the difraction rating. The grating will diffract and reflect the beam while at the same time dispersing it into four beams. The four beams will travel back through the GRIN lens and exit at output locations at the surface of the lens. Output optical fibers are appropriately located to intercept each of the beams for subsequent signal extraction.

In many applications, it is critical to provide redundancy to minimize disruption in the communication link. One type of redundancy is path redundancy which can be accomplished by using more than one fiber extending from the source to the receiver. In such a case, if the primary input fiber fails for some reason, information can be switched over into the secondary fiber so that communication can continue. Another type of failure is failure of the terminal equipment. In this case, after signals have been demultiplexed, it may happen that one or more of the detectors used to extract information from the demultiplexed signals has failed. In such a case, it is important to provide back up terminal equipment which can be utilized when the primary terminal equipment ceases to function properly.

It is therefore an object of this invention to provide a multiplexer/demultiplexer which can provide path redundancy, terminal equipment redundancy or both path and terminal equipment redundancy.

It is a further object of this invention to provide such a multiplexer/demultiplexer with total or partial redundancy which is highly reliable and simple in construction.

SUMMARY OF THE INVENTION

The wavelength division multiplexer/demultiplexer with path and terminal equipment redundancy according to this invention, includes a gradient index of refraction (GRIN) lens and a diffraction grating located adjacent to one end of the GRIN rod lens. The diffraction grating is adapted for switching from a first angle with respect to the GRIN lens to a second angle. First and second input optical fibers are located at first and second input locations on the other end of the GRIN lens, and a first and second plurality of output optical fibers are located on this other end of the GRIN lens opposite the diffraction grating. The input optical fibers and output optical fibers are located so that optical energy will travel from the first input optical fiber to the first plurality of output optical fibers when the diffraction grating is oriented at the first angle and optical energy will travel from the second input optical fiber to the second plurality of output optical fibers when the diffraction grating is oriented at the second angle.

BRIEF DESCRIPTION OF THE DRAWING

The invention disclosed herein will be better understood with reference to the following drawing of which.

DESCRIPTION OF THE PREFERRED EMBODIMENT

Figure 1:
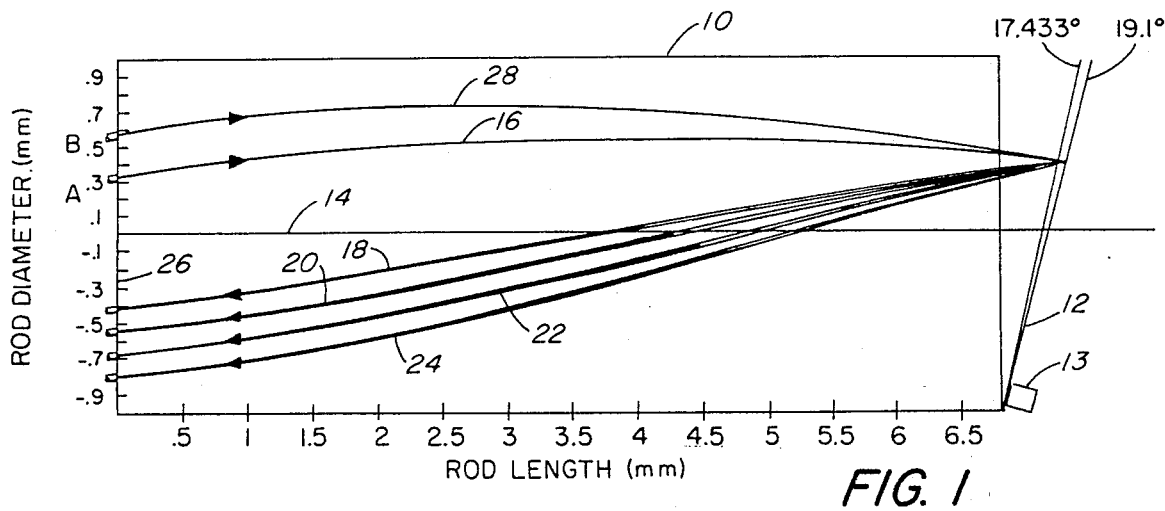
FIG. 1 is a schematic representation of the multiplexer/demultiplexer disclosed herein for providing path redundancy.

FIG. 1 illustrates an embodiment of the invention disclosed herein for providing path redundancy in a wavelength division multiplexer/demultiplexer. A gradient index of refraction (GRIN) lens 10 has an index of refraction which varies from the center line outwardly. Because of such variation in the index of refraction, rays passing through the lens are focused. Located adjacent to an end of the GRIN lens 10 is a diffraction grating 12. The diffraction grating 12 is mounted so that its angle with respect to the axis of the GRIN lens 10 can be switched, in this case, from an angle of 17.433° to an angle of 19.1°. For example, an electric motor could be employed to rotate the diffraction grating between these two angles. Alternatively, the piezoelectric effect could be utilized in which the diffraction grating is affixed to a crystal 13 which will deform suitably under the influence of an appropriate electromagnetic field. If optical energy is introduced into the GRIN lens 10 at the location A, approximately 0.3125 mm from the optical axis 14 at an angle of approximately 8.4339°, the optical energy will travel along a ray 16. In this example, we will assume that the optical energy in the ray 16 is made up of four wavelengths, namely 0.8 micrometers, 0.8334 micrometers, 0.86626 micrometers and 0.89873 micrometers. If the diffraction grating 12 is in its first position at an angle of 17.433°, then the ray 16 will be diffracted and reflected into the four rays 18, 20, 22 and 24. These rays will travel back through the GRIN lens 10 and impinge upon an end surface 26 of the GRIN Lens 10 at the locations −0.41466, −0.54103, −0.66798 and −0.79577. Suitable output optical fibers would be located at these positions to receive the four rays 18–24 and carry them to terminal equipment for further processing to extract any information they may carry. In this example, the GRIN lens 10 has an index gradient constant of 0.225 mm$^{-1}$. This constant, when applied to the quadratic nature of the lens index of refraction, defines the rate at which the index changes in a radial direction from the core. The GRIN lens 10 also has an index constant of 1.552 which defines the index of refraction at the axis of the lens.

Suppose the optical fiber which is injecting optical energy into the GRIN lens 10 at the location A fails for some reason such as a break in the fiber. A back up fiber located at the position B, approximately 0.5625 mm from the optical axis 14 would be provided to provide path redundancy. Optical energy injected at this location will travel along a ray 28. If the diffraction grating 12 is switched from the first position at 17.433° to the second position at 19.1°, then optical energy traveling along the ray 28 will be reflected and diffracted substantially along the rays 18, 20, 22 and 24 so that output optical fibers located as before, will intercept the output energy. In this example, the optical fibers have a core diameter of approximately 55 micrometers so that any slight variation in the paths of the rays will still fall within the core of the output fiber.

Thus, if there should be a failure in the path A into the GRIN lens 10, the path B can be utilized by simply switching the angle of the diffraction grating 12 thereby providing path redundancy. Since the switching of the angle of the diffraction grating can be accomplished very rapidly, interruption in the communication channel would be kept to a minimum.

Figure 2:
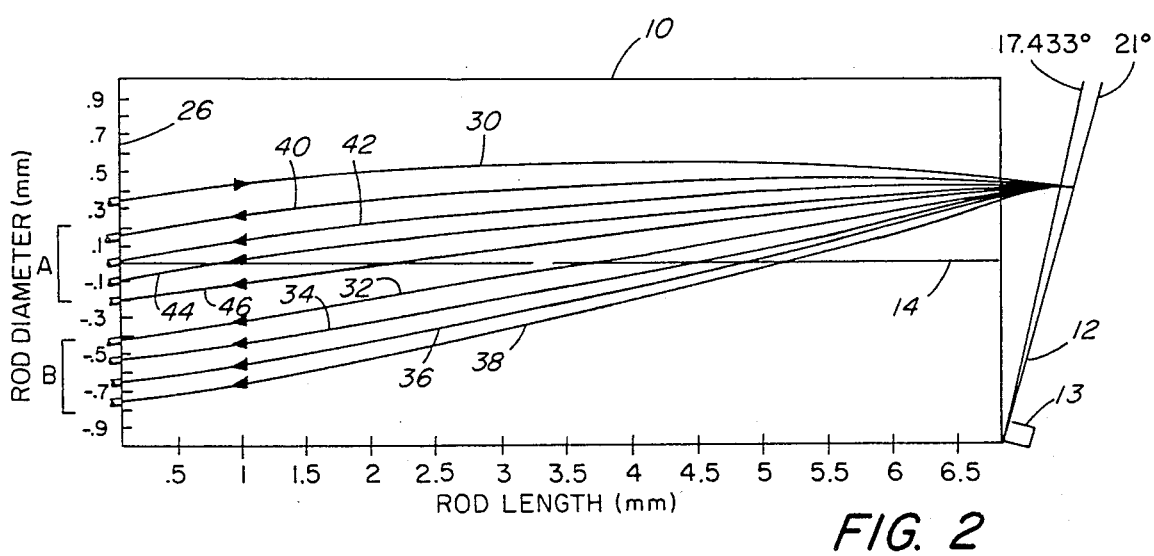
FIG. 2 is a schematic representation of the multiplexer/demultiplexer for providing terminal equipment redundancy.

FIG. 2 illustrates an embodiment of the invention which will provide for terminal equipment redundancy rather than path redundancy as discussed above in reference to FIG. 1. In FIG. 2, the GRIN lens 10 has the same characteristics as described above with reference to FIG. 1. Optical energy is injected into the GRIN lens 10 at a location approximately 0.3125 mm above the optical axis 14 at an angle of 8.4339°. When the diffraction grating 12 is at a first angle of 17.433°, a ray 30 passing through the GRIN Lens 10 will be reflected and diffracted by the grating 12 into the four rays 32, 34, 36 and 38 which will travel back through the GRIN lens 10 and intersect the end surface 26 at locations of −0.41466, −0.54103, −0.66798 and −0.79577 mm from the optical axis 14. These locations have been indicated by the bracket labeled A. It is assumed that optical fibers are located at these positions so as to receive the optical energy and transport it to terminal equipment for signal extraction. If, for example, one or more of the optical fibers at the location A fails or if the equipment which detects the signals should fail in any way, redundancy can be provided by switching the diffraction grating 12 from 17.433° to an angle of 21°. In this case, optical energy traveling along the ray 30 will be reflected and diffracted along the rays 40, 42, 44 and 46 which intersect the end surface 26 at locations 0.15001, 0.027758, −0.094153 and −0.21583 mm from the optical axis. These four positions have been bracketed and indicated by the letter B. If output optical fibers are located at these positions, they will intercept the optical energy traveling along the ray 30. The optical fibers in the B locations would go to back up terminal equipment for signal processing. Thus, if the fibers at location A or the terminal equipment associated therewith fails, the diffraction grating 12 is switched to 21° and the optical fibers at B and their associated terminal equipment are utilized. In this way, terminal equipment redundancy is provided so as to maintain an intact communication path.

Figure 3:
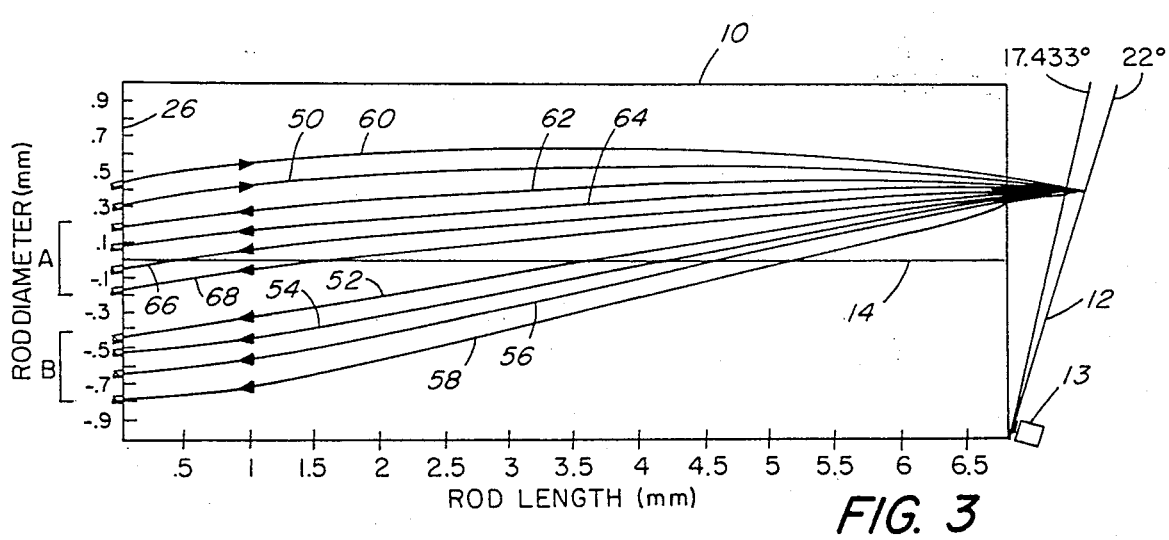
FIG. 3 is a schematic representation of a multiplexer/demultiplexer for providing both path and terminal equipment redundancy.

FIG. 3 is an embodiment of the invention which will provide total redundancy, that is, both path and terminal equipment redundancy. Suppose that an optical fiber A located at 0.3125 mm from the optical axis 14 of a GRIN lens 10 carries the multiplexed wavelengths as set forth in relation to FIG. 1. The optical energy will travel along a ray 50. When the diffraction grating 12 is at the first angle of 17.433°, the ray 50 will be reflected and diffracted along the rays 52, 54, 56 and 58 and will impinge on the surface 26 of the GRIN rod 10 at locations −0.41466, −0.54103, −0.66798 and −0.79577 mm from the optical axis 14. Suitable optical fibers would be located at these positions indicated by the bracket labeled A' for carrying the signals to terminal processing equipment. If the optical fiber A is damaged or if the fibers at A' or the associated terminal equipment should fail, the grating 12 is switched to a second position at an angle of 22°. In this case, an optical fiber B is utilized as an input at a location of 0.4375 mm from the optical axis. Optical energy traveling along a ray 60 will be reflected and diffracted by the diffraction grating 12 so that the four rays 62, 64, 66 and 68 impinge upon the surface 26 at locations 0.17925, 0.056426, −0.065996 and −0.18825 mm from the optical axis 14. These locations are indicated by the bracket labeled B'. Suitable output fibers are positioned at these locations and lead to a back up set of signal processing equipment (not shown). Thus, total redundancy is achieved in that no matter whether the path indicated by the optical fiber A fails or the terminal equipment associated with the output locations at A', communication is established by switching the diffraction grating 12 and utilizing the optical fiber B and the output optical fibers at the positions indicated by B' thus assuring continuation in the communication channel.

It is emphasized that GRIN lenses having other characteristics can be utilized. In such a case it is of course to be understood that the input and output locations will vary from those given in the embodiments of FIGS. 1, 2 and 3. The appropriate angles of the diffraction grating will also vary depending on the characteristics of the particular GRIN rod selected. It is also emphasized that while the embodiments have been described in relation to demultiplexers, the same technique can be used for multiplexers. In such a case, all of the ray paths would be reversed.

It is thus seen that the objects of this invention have been achieved in that there has been described wavelength division multiplexer/demultiplexer apparatus which can provide path redundancy, terminal equipment redundancy or total redundancy. This is accomplished by providing a diffraction grating which can be switched from one orientation to another orientation upon a failure in either the path or the terminal equipment utilized to process the optical signals. It is recognized that modifications and variations will occur to those skilled in the art and it is intended that all such modifications and variations be included within the scope of the appended claims.

What is claimed is:

1. Wavelength division multiplexer/demultiplexer with path and terminal equipment redundancy comprising:

a gradient index of refraction (GRIN) lens having an optical axis;

a diffraction grating located adjacent to one end of said GRIN lens, said diffraction grating adapted for switching from a first angle to a second angle with respect to said GRIN lens optical axis;

first and second input optical fibers located at first and second input locations on the other end of said GRIN rod lens; and a first and a second plurality of output optical fibers located on said other end of said GRIN lens;

wherein optical energy will travel from said first input optical fiber to said first plurality of output optical fibers when said diffraction grating is oriented at said first angle and optical energy will travel from said second input optical fiber to said second plurality of output optical fibers when said diffraction grating is oriented at said second angle.

2. The apparatus of claim 1 wherein said switching means is a piezoelectric crystal.

3. Wavelength division multiplexer/demultiplexer with path redundancy comprising:

a gradient index of refraction (GRIN) lens having an optical axis;

a diffraction grating located adjacent to one end of said GRIN lens, said diffraction grating adapted for switching from a first angle to a secnd angle with respect to said GRIN lens optical axis;

first and second input optical fibers located at first and second input locations on the other end of said GRIN lens; and a plurality of output optical fibers located on said other end of said GRIN lens;

wherein optical energy will travel from said first input optical fiber to said plurality of output optical fibers when said diffraction grating is oriented at said first angle and optical energy will travel from said second input optical fiber to said plurality of output optical fibers when said diffraction grating is oriented at said second angle.

4. The apparatus of claim 3 wherein said switching means is a piezoelectric crystal.

5. Wavelength division multiplexer/demultiplexer with terminal equipment redundancy comprising:

a gradient index of refraction (GRIN) lens having an optical axis;

a diffraction grating located adjacent to one end of said GRIN lens, said diffraction grating adapted for switching from a first angle to a second angle with respect to said GRIN lens optical axis;

an input optical fiber located at an input location on the other end of said GRIN lens; and a first a second plurality of output optical fibers located on said other end of said GRIN lens;

wherein optical energy will travel from said input optical fiber to said first plurality of output optical fibers when said diffraction grating is oriented at said first angle and optical energy will ravel from said input fiber to said second plurality of output optical fibers whensaid diffraction grating is oriented at said second angle.

6. The apparatus of claim 5 wherein said switching means is a piezoelectric crystal.

* * * * *